Sept. 17, 1940.  W. J. MORRILL  2,215,294

CONTROL DEVICE

Filed Feb. 23, 1940

Inventor:
Wayne J. Morrill
by Harry E. Dunham
His Attorney.

Patented Sept. 17, 1940

2,215,294

UNITED STATES PATENT OFFICE 2,215,294

CONTROL DEVICE

Wayne J. Morrill, Fort Wayne, Ind., assignor to General Electric Company, a corporation of New York Application February 23, 1940, Serial No. 320,226

8 Claims. (Cl. 200—80)

My invention relates to a control device, and more particularly to a centrifugal mechanism and switch, for example, as used in dynamo-electric machines for controlling the circuit of the starting winding.

An object of my invention is to provide an improved control device which is simple in construction, reliable in operation, and which can be readily manufactured.

Another object of my invention is to provide a centrifugal mechanism and switch wherein there is no rubbing contact between the centrifugal mechanism and switch.

Further objects and advantages of my invention will become apparent from the following description referring to the accompanying drawing, and the features of novelty which characterize my invention will be pointed out with particularity in the claims annexed to and forming a part of this specification.

Figure 1:
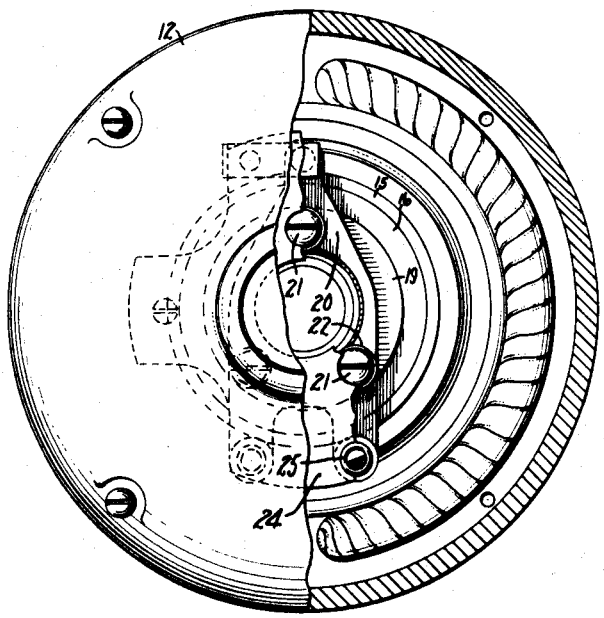
Figure 2:
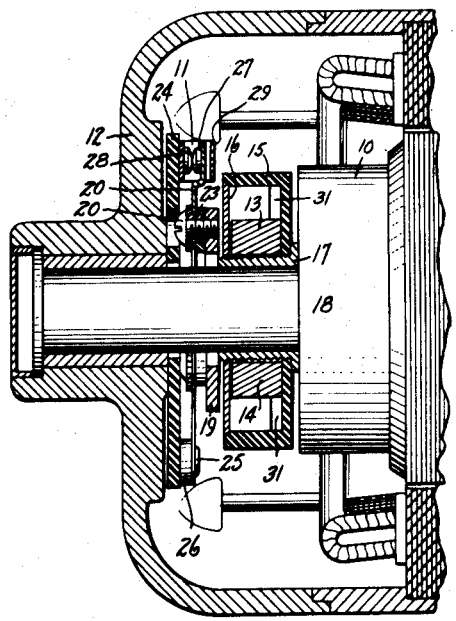
Figure 3:
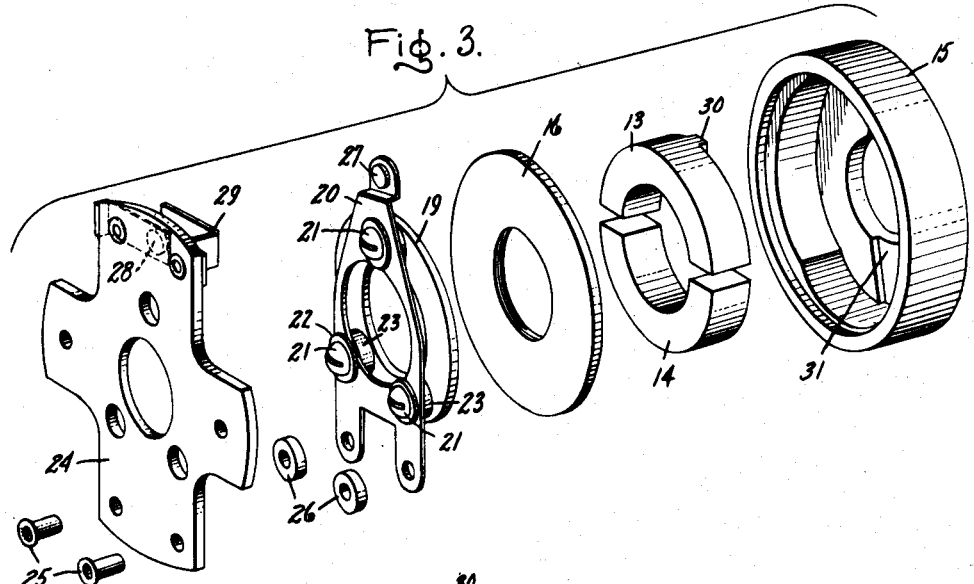
Figure 4:
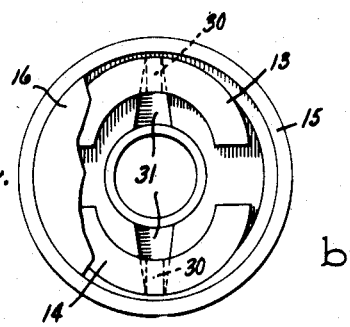

In the drawing Fig. 1 is an end view in partial section of a dynamo-electric machine provided with my improved centrifugal mechanism and switch, Fig. 2 is a sectional side elevation of the end of the dynamo-electric machine illustrated in Fig. 1, Fig. 3 is an exploded perspective view of my improved centrifugal mechanism and switch illustrated in Figs. 1 and 2, and Fig. 4 is an end view of the centrifugal mechanism illustrated in Figs. 1, 2, and 3.

Referring to the drawing, in Figs. 1 and 2 I have illustrated a centrifugal operating mechanism attached to an end of a rotatable member 10 of a dynamo-electric machine, which mechanism may be used to actuate a switch 11 which is attached to a stationary portion 12 of the dynamo-electric machine, the switch member being in the starting winding circuit. My improved centrifugal mechanism includes outwardly movable magnet members 13 and 14 with unlike poles adjacent each other so that the magnetic attraction thereof can resist outward movement of the magnet members caused by rotation of the rotatable member of the dynamo-electric machine. In order to shield the magnets from the windings of the dynamo-electric machine the magnets are placed inside a non-magnetic casing 15. The magnets are held in the casing by a non-magnetic cover 16, which is in turn held in place by a non-magnetic bushing 17 which extends axially of the casing. The whole assembly of the casing and bushing is held securely to the rotatable member by means of knurls on a shaft 18. The non-magnetic casing is tightly held on the shaft member a sufficient distance from the windings of the dynamo-electric machine so as to prevent the flux from the windings from interfering with the magnetic mechanism.

In order to provide a simple arrangement for actuating the switch member 11, I provide an armature ring member 19 which surrounds the shaft and is adjacent the non-magnetic cover 16. A contact spring 20 is in turn attached to the armature ring 19 in any suitable manner, such as by rivets 21. Insulating members 22 and 23 are placed between the contact spring and the armature 19 so as to insulate the contact spring and the rivets from the armature. The contact spring 20 and armature 19 are in turn mounted for axial movement on a stationary mounting plate 24. The mounting of the spring member to the stationary mounting plate may be made in any suitable manner, such as by rivets 25. Insulating washers 26 are placed around the rivet members and between the mounting plate and the contact spring so as to provide a spacer between the spring member and the mounting plate. The end of the contact spring remote from its stationary support carries a contact 27 which is adapted to co-operate with a contact 28 which is attached to the supporting plate 24. A bracket member 29 is also held by the stationary mounting plate 24 which acts as a stop to prevent the armature ring from coming in contact with the cover plate 16.

The operation of my centrifugal mechanism and switch is as follows: When the dynamo-electric machine is in its stationary position movable contact 27 contacts the stationary contact 28 as shown in Fig. 2, since the movable contact spring 20 is biased in that direction. Also the unlike poles of the magnet members 13 and 14 will be in contact with each other. As the rotatable member 10 of the dynamo-electric machine begins to rotate the magnets will rotate also, since the magnets are forced to rotate with the non-magnetic casing 15. This may be accomplished in any suitable manner, and as illustrated in Fig. 3, tongue or ridge members 30 project from the magnets into co-operating slots 31 in the non-magnetic casing. The slot members 31 are larger than the tongue members 30 so that even though the magnets are forced to rotate with the non-magnetic casing, the magnets may move outwardly or radially when the centrifugal force due to the rotation of the magnets overcomes the magnetic attraction between the magnets. At the desired speed, when the members 13 and 14 move outwardly, the leakage flux from the magnets will pass out through the non-magnetic cover and link the armature ring 19. This will cause the armature ring 19 to move towards the cover, thus causing the opening of the contacts 27 and 28. It will be apparent that the desired critical speed at which the centrifugal force of the magnets overcomes their magnetic attraction may be varied in any suitable manner. The magnets may be magnetized with a high coercive force and then knocked down to the point desired. Also, non-magnetic spacers may be placed on the poles of the magnets so as to decrease the magnetic attraction therebetween.

In view of the foregoing, it will be seen that I have provided a centrifugal mechanism and switch wherein there is no rubbing action between the centrifugal operating mechanism and the switch. Furthermore, I have provided a centrifugal mechanism which uses magnetic force to resist outward movement instead of the usual springs. Thus I provide a centrifugal mechanism which operates magnetically and therefore actuates the switch member with a minimum of friction and noise.

Modifications of the particular arrangements which I have disclosed embodying my invention will occur to those skilled in the art, so that I do not desire my invention to be limited to the particular arrangements set forth and I intend in the appended claims to cover all modifications which do not depart from the spirit and scope of my invention.

What I claim as new and desire to secure by Letters Patent of the United States is:

1. A centrifugal switch including a movable armature, outwardly movable magnets for actuating said armature, said magnets being arranged with unlike poles adjacent each other for resisting outward movement of said magnets, and a circuit controlling device arranged to be actuated by said armature.

2. A centrifugal switch including an axially movable armature, outwardly movable magnets for actuating said armature upon outward movement, said magnets being arranged with unlike poles adjacent each other for resisting outward movement of said magnets, and a circuit controlling device arranged to be actuated by said armature.

3. A centrifugal switch including an axially movable armature, a non-magnetic casing adjacent said armature, outwardly movable magnets within said casing for actuating said armature, said magnets being arranged with unlike poles adjacent each other for resisting outward movement of said magnets, and a circuit controlling device arranged to be actuated by said armature.

4. A centrifugal switch including a movable armature, outwardly movable magnets for actuating said armature, said magnets being arranged with unlike poles adjacent each other for resisting outward movement of said magnets, said armature being magnetically associated with said magnets so that upon outward movement thereof the leakage flux therefrom will cause movement of said armature, and a circuit controlling device arranged to be actuated by said armature.

5. A centrifugal switch including an axially movable armature, radially movable magnet means for actuating said armature, said magnet means being so arranged that its magnetism resists its radial movement, and a circuit controlling device arranged to be actuated by said armature.

6. A control device including a movable armature, relatively movable magnets for actuating said armature, said magnets being arranged with unlike poles adjacent each other for resisting movement of said magnets, said armature being magnetically associated with said magnets so that upon movement thereof the leakage flux therefrom will cause movement of said armature, and a circuit controlling device arranged to be actuated by said armature.

7. A centrifugal mechanism including outwardly movable magnets mounted on a rotatable body, said magnets being arranged with unlike poles adjacent each other for resisting outward movement of said magnets, and an armature adjacent said magnets so that upon outward movement of said magnets the leakage flux from said magnets will cause said armature to move.

8. A control device including a movable armature, movable magnet means for actuating said armature, said magnet means being so arranged that its magnetism resists its movement, said armature being magnetically associated with said magnet means so that upon movement thereof the leakage flux therefrom will cause movement of said armature, and a circuit controlling device arranged to be actuated by said armature.

WAYNE J. MORRILL.